United States Patent [19]

Harland et al.

[11] 3,815,421

[45] June 11, 1974

[54] GAUGE WITH CEMENTED BOURDON

[75] Inventors: Philip W. Harland, Perkasie; Ralph D. Waite, Sellersville, both of Pa.

[73] Assignee: Amtek, Inc., New York, N.Y.

[22] Filed: Dec. 4, 1972

[21] Appl. No.: 311,669

[52] U.S. Cl. .............................................. 73/418
[51] Int. Cl. ......................................... G01l 7/04
[58] Field of Search ................... 73/418, 411, 420; 116/DIG. 23

[56] References Cited
UNITED STATES PATENTS

| | | | |
|---|---|---|---|
| 2,794,412 | 6/1957 | Rauth | 116/DIG. 23 |
| 3,213,688 | 10/1965 | Huston | 73/418 |
| 3,222,933 | 12/1965 | Howard | 73/418 |
| 3,338,101 | 8/1967 | Krasnitz et al. | 73/411 |
| 3,641,820 | 2/1972 | Bissell | 73/418 |

*Primary Examiner*—Donald O. Woodiel
*Attorney, Agent, or Firm*—Smythe & Moore

[57] ABSTRACT

A pressure gauge of the Bourdon tube type, especially useful in conjunction with fire extinguishers, has an annular recess formed within the cylindrical casing and the periphery of the dial face is resiliently held in place by suitable means. The Bourdon tube is sealed at the pointer end and is formed into a planar multi-turn spiral with the other end extending radially at substantially right angles to the spiral and sealingly secured within the supporting post by means of an adhesive.

5 Claims, 6 Drawing Figures

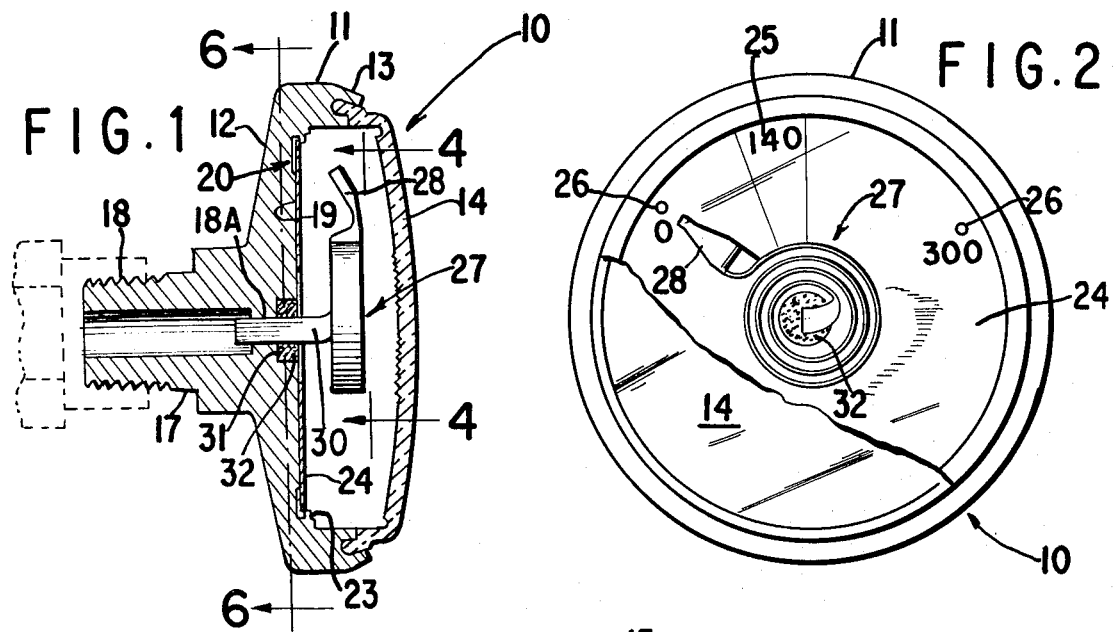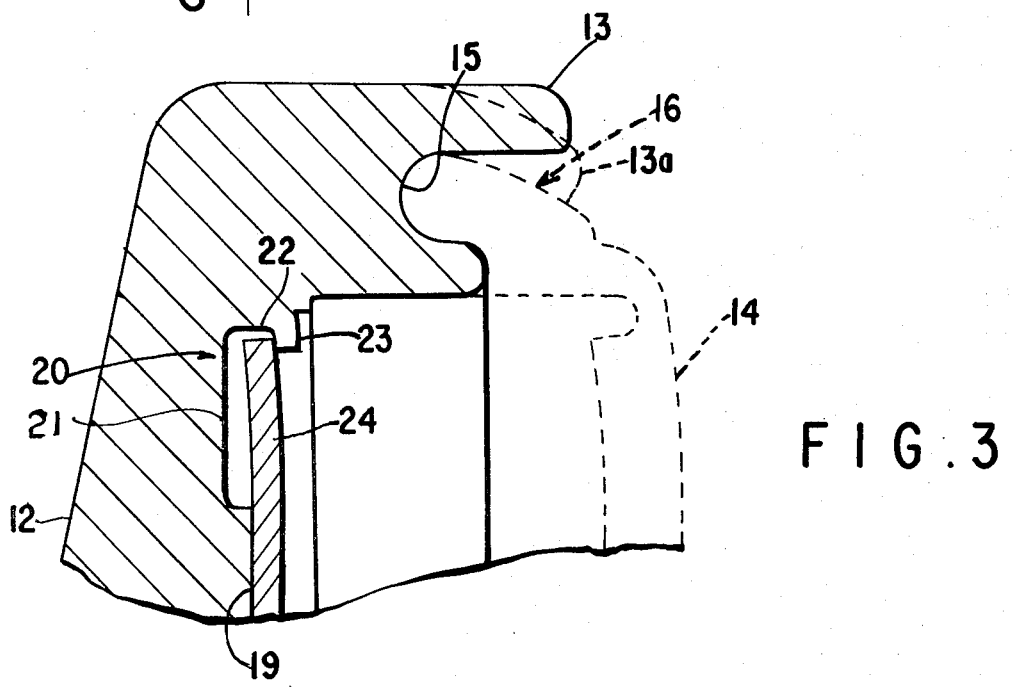

PATENTED JUN 11 1974 3,815,421
SHEET 2 OF 2
FIG. 4
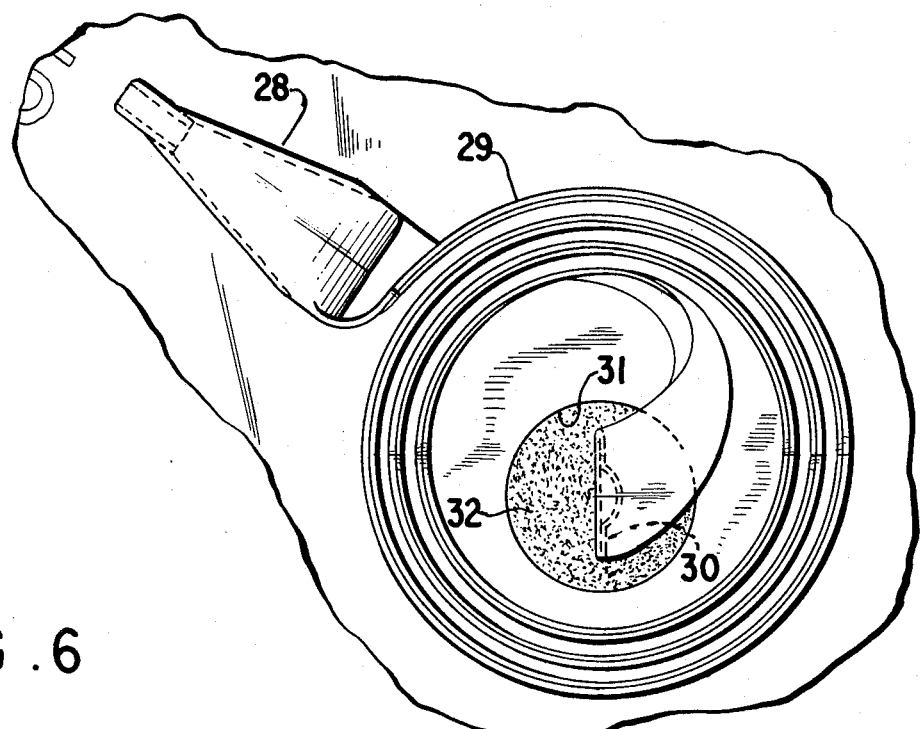
FIG. 6
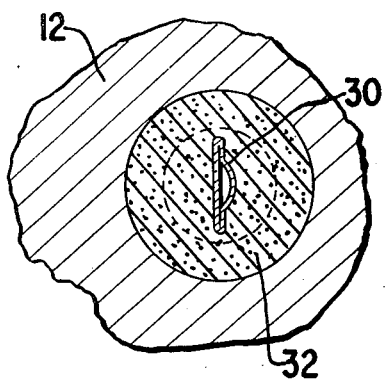
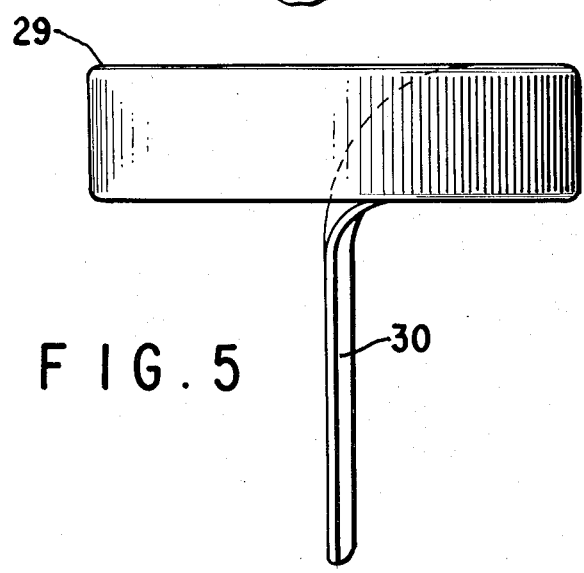
FIG. 5

GAUGE WITH CEMENTED BOURDON

This invention relates to gauges useful in conjunction with fire extinguishers, particularly the dial and Bourdon tube construction thereof.

Pressure gauges of the Bourdon tube type have had extensive use in low cost, light-weight fire extinguishers to give an indication of the pressure of the extinguisher so that the probable effectiveness of the extinguisher is readily apparent to an observer. While such gauges are preferably small and inexpensive, they must be reliably constructed so that an accurate determination of the condition of the extinguishers can quickly be made. The indicator in such gauges generally comprises a pointer on the sealed end of a Bourdon tube with the pointer moving over a scale on a dial face in response to the pressure sensed by the Bourdon tube. The other end of the Bourdon tube is sealed to a cylindrical post extending from the closed end of the cylindrical casing of the gauge with the post being connected to the extinguisher. Although the dial face is not a structural component of the gauge since it performs only an indicating function, various constructions have been adopted in order to simplify the assembly and installation of a dial face within the gauge. Many assemblies have not been completely satisfactory since the structure necessary to secure the dial face position added to the complexity and cost of the extinguisher.

In addition, the sealing of an end of the Bourdon tube within the supporting post of the gauge contributed to the complexities of the assembly operation and to the overall expense of fabricating the gauge.

One of the objects of the present invention is to provide an improved fire extinguisher gauge of the Bourdon tube type.

Another of the objects of the present invention is to provide an improved mounting for the dial face of a Bourdon tube-type pressure gauge.

Another of the objects of the present invention is to provide a simple and relatively inexpensive structure for sealingly securing an end of the Bourdon tube to the supporting post of the gauge.

According to one aspect of the present invention, the fire extinguisher pressure gauge may comprise a cylindrical casing having an open end and a supporting post in the other closed end thereof. A viewing window is secured on the open end of the casing, and a Bourdon tube is provided which has one end sealed in the supporting post and a pointer on the other end thereof which may be integral or separately attached thereto. The interior of the cylindrical casing is provided with means defining an annular groove adjacent the inner face of the closed end, and a dial face has its peripheral edge positioned thereon so that the dial face is installed merely by placing its peripheral edge thereon and then staking the same in place. The dial can be adjusted with ease.

The Bourdon tube is sealed at the pointer end and has a relatively flat cross section throughout. The tube is formed into a planar multi-turn spiral with its other end extending axially at substantially right angles to the spiral and sealingly secured within the gauge-supporting post by adhesive means.

Other objects, advantages and features of the present invention will become apparent from the accompanying description and drawings, which are merely exemplary.

In the drawings:

FIG. 1 is a longitudinal sectional view through a fire extinguisher gauge incorporating the present invention;

FIG. 2 is a front elevational view of the pressure gauge of FIG. 1 with a portion of the viewing window being removed;

FIG. 3 is a portion in enlarged scale of the edge of the gauge shown in FIG. 1, showing in detail the mounting of the dial face;

FIG. 4 is a fragmentary plan view of the Bourdon tube and pointer assembly of the gauge of FIG. 1;

FIG. 5 is a side elevational view of the Bourdon tube and pointer assembly of FIG. 4; and FIG. 6 is a portion of the sectional view taken along the line 6—6 of FIG. 1 and showing the sealing of the open end of the Bourdon tube in the casing.

Proceeding next to the drawings wherein like reference symbols indicate the same parts throughout the various views, a specific embodiment of the present invention will be described in detail.

A pressure gauge incorporating the present invention is indicated generally at 10 in FIG. 1 and comprises a substantially cylindrical casing 11 having a closed rear wall 12 and an open front 13 sealed by a transparent viewing window 14. In the form shown, open end 13 of the casing is provided with an annular groove 15 which receives a beaded flange 16 on the outer periphery of the viewing window 14. The outer edge 13 of the casing is bent over as shown in 13a in FIG. 3 to retain the viewing window in position. Other types of casing means can be used.

In the rear wall 12 of the casing, there is provided a cylindrical support post or socket 17 which has a threaded exterior portion 18 to facilitate mounting of the gauge, the portion 18 including a bore 18A.

Within the casing 11, the inner face of the rear wall indicated at 19 is provided with a groove 20.

A dial face 24, which may have a scale with indicia or figures 25, is mounted against the inner face 19 by having its peripheral edge 26 staked in place by turned-in portion 23. The recessed portion 21 of the groove 20 enables the edge of the dial face to be bent inwardly so as resiliently to hold the dial in place. The dial face can be rotated for adjustment or setting purposes. Once the dial has been put in place in casing 11, it can be staked in place by turned-in or staking portions 23. The dial then can be rotated to its desired position where it will be held firmly.

A Bourdon tube indicated generally at 27 has a pointer 28 at one end which is sealed. The pointer 28 is positioned to move over the surface of the dial face in proximity to the indicia 25 as shown in FIG. 2. The pointer can be integral with the tube or secured thereto.

The Bourdon tube 27 is substantially flat in cross section and is coiled into a planar multi-turn spiral 29. The other end 30 of the Bourdon tube is open and extends axially at substantially a right angle to the spiral as may be seen in FIG. 5. The open end 30 of the Bourdon tube is inserted into bore 18A or onto depression or recess 31 formed in the inner face 19 of the casing so as to communicate with a source of pressure to which the threaded end is attached. The depression or recess 31 can be omitted.

In order to sealingly secure the end 30 of the Bourdon tube in position, an adhesive is provided at 32 to secure the Bourdon tube in position. Many such structural adhesives are known which can be one-part or two-part adhesives. One suitable adhesive, given only by way of example, is aluminum-filled, one-part and heat-curing which has high temperature resistance and has a paste consistency and preferably a high temperature short-term cure to enable high-strength, heat-resistant bonds to be obtained with metals, glass and some plastics. One such adhesive is manufactured by the 3M Company and has an epoxy base.

The use of such a structural adhesive not only securely retains the Bourdon tube in position but seals the Bourdon tube within the casing so as to prevent any leakage therein of liquids or gases. Further, the use of the structural adhesive significantly simplifies the manufacturing process, while at the same time reducing the cost of assembly of the gauge.

It will be understood that changes in various details of construction and arrangement of parts may be made without departing from the spirit of the invention except as defined in the appended claims.

What is claimed is:

1. In a pressure gauge, the combination of a cylindrical casing having an open end with a flat inner dial receiving face and a supporting post in the other closed end thereof, a viewing window secured on said open end of said casing, a Bourdon tube having one end projecting into and cemented in said supporting post and a pointer on the other end thereof, means defining an annular recess having an outer annular turned-in portion within said cylindrical casing adjacent the inner face of said closed end, and a dial face substantially surrounding said one end of the Bourdon tube with indicia thereon cooperatively related to said pointer and having its peripheral edge positioned adjacent said recess so as to underlie said turned-in portion and staked in axial position therein, said dial face being rotatable for adjustment thereof.

2. A pressure gauge as claimed in claim 1 wherein said recess extends radially of said closed end inner face.

3. A pressure gauge as claimed in claim 1 wherein said Bourdon tube is sealed at the pointer end and has a relatively flat cross section throughout and is formed into a planar multi-turn spiral with the outer end extending axially at substantially right angles to the spiral.

4. A pressure gauge as claimed in claim 3 having a centrally arranged recess in said flat face and comprising adhesive means in said centrally arranged recess for sealingly securing said Bourdon tube other end within said supporting post.

5. A pressure gauge as claimed in claim 4 wherein the adhesive is a high temperature short-term cure adhesive.

* * * * *

UNITED STATES PATENT OFFICE
CERTIFICATE OF CORRECTION

Patent No. 3,815,421            Dated June 11, 1974

Inventor(s) Philip W. Harland and Ralph D. Waite

It is certified that error appears in the above-identified patent and that said Letters Patent are hereby corrected as shown below:

Column 2, line 62, "onto" should be --into--.
Column 4, line 17, "outer" should be --other--.

Signed and sealed this 1st day of October 1974.

(SEAL)
Attest:

McCOY M. GIBSON JR.           C. MARSHALL DANN
Attesting Officer               Commissioner of Patents